No. 836,706. PATENTED NOV. 27, 1906.
F. H. RICHARDS.
FASTENING DEVICE.
APPLICATION FILED JAN. 21, 1901.
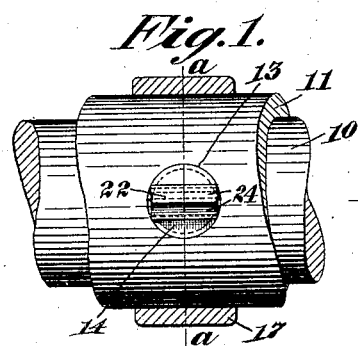
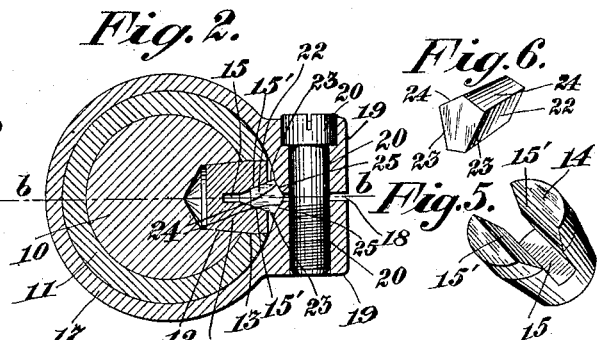
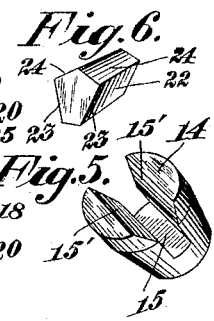
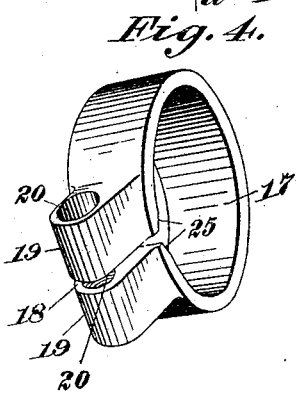
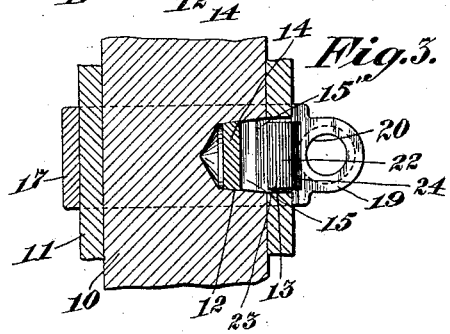
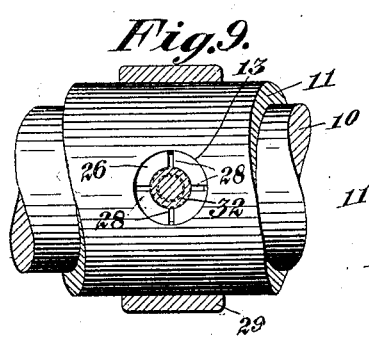
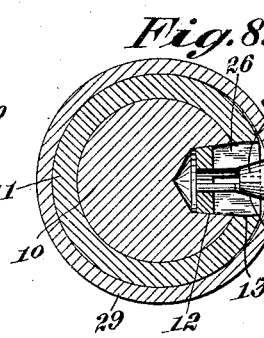
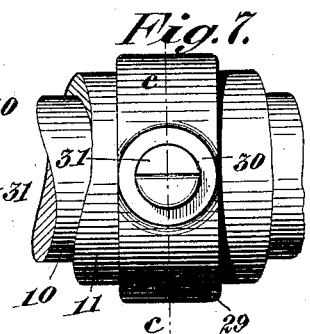
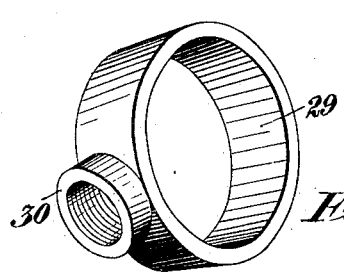
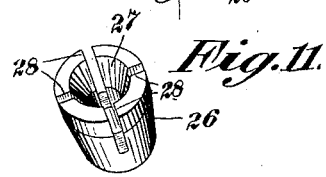
Witnesses
C. E. Bridge.
F. H. Hariland
Inventor
F. H. Richards

UNITED STATES PATENT OFFICE.

FRANCIS H. RICHARDS, OF HARTFORD, CONNECTICUT.

FASTENING DEVICE.

No. 836,706.   Specification of Letters Patent.   Patented Nov. 27, 1906.

Application filed January 21, 1901. Serial No. 44,109.

*To all whom it may concern:*

Be it known that I, FRANCIS H. RICHARDS, a citizen of the United States, residing at Hartford, in the county of Hartford and State of Connecticut, have invented certain new and useful Improvements in Fastening Devices, of which the following is a specification.

This invention relates to improvements in fastening devices, and more particularly to means for securing together small elements, such as concentric shafts the walls of which may be too thin to permit of the use of such a fastening as a set-screw, and in which precision in positioning is desired.

In the accompanying drawings, Figure 1 is a side elevation of a short portion of two shafts secured together by one form of my invention, a retaining-collar thereof being shown in section. Fig. 2 is a full transverse section on the line *a a*, Fig. 1. Fig. 3 is a longitudinal section on the line *b b* of Fig. 2. Figs. 4, 5, and 6 are respectively perspective views of a retaining-collar, an expansible plug, and an actuator and expander therefor. Fig. 7 is a side elevation of another form of my invention. Fig. 8 is a transverse section on the line *c c* of Fig. 7. Fig. 9 is a view similar to Fig. 7, but with the collar and the actuator which it carries shown in section; and Figs. 10, 11, and 12 are perspective views, respectively, of a retaining-collar, an expansible plug, and an actuating-screw therefor.

Similar characters designate like parts throughout the different figures of the drawings.

My improved fastening device is herein shown as applied to the securing together of two small concentric shafts, they being considerably enlarged in the drawings, the inner shaft 10 of which is solid and surrounded by the tubular shaft 11. In the shaft 10 is formed a recess or opening 12, preferably with inwardly-tapered side walls, and through one side of the shaft 11 is an opening 13, which may be cylindrical and somewhat larger than the outside of the recess 12 and adapted to register therewith. In the recess and extending into the opening 13 is seated an expansible plug or member 14, having its inner end formed similarly to the recess, and an outer portion cylindrical and fitting the opening 13, but of somewhat less length than the thickness of the wall of the shaft 11. The plug is divided longitudinally at 15 for a portion of its length, the opening being preferably diametrical and having at least the outer portion of its side walls at 15' 15' inclined, so that they diverge outward.

Surrounding the shaft 11 and extending over the opening and recess and plug therein is a collar or retaining member 17, which is preferably divided at 18 and is provided on each side of the opening with a flange or thickened portion 19. Through the flanges are openings 20 20 in alinement, one of which is threaded for engagement by a screw 21 passing through the other. Between the collar and the plug is situated an actuator and expander 22 for said plug, which may be a section of wedge-shaped bar having inclined sides 23 23, lying at substantially the same angles as the walls 15' 15' of the plug which they engage. The expander extends outside the opening in the plug and is provided at its outer end with two inclined surfaces 24 24, forming quite an obtuse angle with each other, which are adapted to contact with similarly-inclined surfaces 25 25, situated on each side of the opening 18 on the collar 17.

In use the fastening device is assembled with the parts to be fastened together by inserting the plug through the opening 13 into the recess 12 and placing the wedge 22 in position in the division in the plug. The collar 17 with the screw loosened is then slipped over the end of the shaft 17 and along it until the inclined surfaces upon the outer side of the wedge enter the space between the inclined surfaces 25 on the collar and the wedge is substantially centered therein. The screw 21 is then tightened, drawing the flanges 19 together and clamping the collar about the outer shaft. At the same time the collar-surfaces 25 tend to ride upward upon the outer wedge-surfaces 24, and thus force the wedge downward between the inclined walls of the plug. This seats the tapered portion of the plug firmly in the recess 12 and at the same time expands its upper portion against the wall of the opening 13, and thus binds the parts securely together.

When it is desired to separate the parts, it may be readily done by loosening the screw and slipping aside the collar, when the wedge may be easily dislodged and the plug will then be free for removal.

In the form of the device shown in Figs. 7 to 12 the plug or expansible member 26 is shown as provided with a central frustoconical recess 27, with the side walls divided in one or more places at 28, so that it may be expansible. Externally it may be formed similarly to the plug 14, previously described. In this instance the collar 29 is continuous and is provided with a perforated boss 30, through which is threaded a screw 31, provided at its inner end with an inwardly-converging contact portion 32, suitably formed to engage the recess in the plug and expand its walls.

As in the previously-described form, the plug is first placed through the opening 13 into the recess 12. Then the collar 29 with its screw raised out of contact with the outer shaft 11 is slid along said shaft until it is in position to admit of the screw end 32 being turned down into the recess in the plug, which will result in said plug being forced down and expanded to secure the shafts together. Separation of the parts may be effected by the reversal of these operations.

It will be seen that this device is particularly adapted for the fastening together of small elements which it may be desired to separate and reassemble with precision, as it permits the changes to be made readily with the exertion of but slight force, and the parts to be always returned to the same relative position.

Having thus described my invention, I claim—

1. The combination with parts to be fastened together of an expansion locking-pin for engaging partially-tapering walls of an opening in each of said parts, and a reaction member for constantly expanding and forcing said pin against said walls thereby holding it in its engaged locking position.

2. A fastening device comprising a reaction member transversely divided at a point in its circumference; means for decreasing its circumference; a member engaging therewith and adapted to be moved centrally in said member by said decrease of the circumference thereof; and an expansible member adapted to engage said centrally-movable member and to be expanded thereby.

3. A fastening device for positioning concentric shafts; said device comprising a reaction member adapted to encircle said shafts; a conical member adapted to engage concentric shafts, and means located in said member for effecting an engagement of said member with said concentric shafts.

4. A fastening device comprising a divided collar provided with inclined surfaces at each side of the opening thereof, an expansible member located within the collar, an expander for said member in contact therewith and with inclined surfaces of the collar; and means for drawing the parts of the collar together.

5. The combination, with the parts to be fastened together, each provided with an opening, of a fastening member within said openings; a retaining element supported upon one of the parts and in proximity to the fastening member; and an actuator for the fastening member in contact therewith and with the retaining element.

6. The combination, with the parts to be fastened together, each provided with an opening, of an expansible member within said openings; a retaining element supported upon one of the parts in proximity to the expansible member; and an actuator for the expansible member in contact therewith and with the retaining element.

7. The combination, with the parts to be fastened together, each provided with an opening having one or more inclined walls, of an expansible member within said openings; a retaining element supported upon one of the parts in proximity to the expansible member; and an expander for the expansible member in contact therewith and with the retaining element.

8. The combination, with inner and outer parts to be fastened together, the former provided with a recess and the latter with an opening, of an expansible member extending through the opening into the recess; a retaining element supported upon the outer part in proximity to the expansible member; and an expander for the expansible member in contact therewith and with the retaining element.

9. The combination, with inner and outer parts to be fastened together provided with registering openings, of a divided plug in said openings; a collar surrounding the parts and plug; and an expander entering the division in the plug and in contact with the collar.

10. The combination, with inner and outer parts to be fastened together provided with registering openings, of a divided plug in said openings; a divided collar surrounding the parts and plug; a wedge adapted to enter the division in the plug and contact with the inside of the collar; and means for drawing the parts of the collar together.

11. The combination with parts to be fastened together of an expansible locking-pin adapted to engage with partially-tapering side walls of an opening in each of said parts, and a reaction member for constantly exerting force against said walls thereby holding said pin in its engaged locking position.

12. The combination with parts to be fastened together of an expansion tapered locking-pin engaging with partially-tapered side walls of an opening in each of said parts, and a reaction member for holding said pin in its engaged locking position.

13. The combination with parts to be fastened together of an expansible locking member engaging with partially-tapering walls of an opening in each of said parts, an expander seated in a recess of the pin, said recess having inclined walls and a reaction member for holding said pin in its engaged locking position.

14. The combination with parts to be fastened together of an expansible locking-pin engaging with partially-tapering walls of an opening in each of said parts, said pin being provided with a recess having inclined walls, and a reaction member for holding said pin in its engaged locking position.

15. The combination with parts to be fastened together, of an expansible locking-pin adapted to be compressed in and against the side walls of an opening in each said part, an expander seated in a recess in the pin, said recess having inclined walls, and a reaction member for compressing said pin in and against the walls to thereby hold the same in its said engaged locking position.

16. The combination with parts to be fastened together of a locking-pin engaging with partially-inclined side walls of an opening in said parts and an encircling collar for holding said pin in its engaged locking position.

17. The combination with concentric engaging shafts one of which having a tapered opening and the other having a partially-tapered opening, and a reaction member operable in said tapered openings for holding said pin in its engaged locking position.

18. The combination with assembled concentric shafts, of an expansible locking-pin engaging with the side walls of an opening in each of said shafts, and a reaction member for expanding said pin and holding the same in its said engaged locking position.

19. The combination with assembled concentric shafts, of a locking-pin engaging with the side walls of an opening in each said shaft, an expander engaging with the side walls of a recess in said pin, and a reaction-collar for holding said pin in its said engaged locking position.

20. The combination with assembled concentric shafts, of an expansible taper locking-pin engaging with the side walls of an opening in each shaft, an expander seated in a recess in said pin, said recess having inclined walls, and a reaction-collar encircling the outer shaft for holding said pin in its said engaged locking position.

21. The combination with parts to be fastened together of a locking member engaging with partially-inclined walls of openings of each of said parts and an encircling collar for forcing said member into the openings and against the walls so as to hold the member in its engaged locking position.

22. The combination with parts to be fastened together, of a locking member engaging with the side walls of openings in each of said parts, and an encircling collar for compressing said member into the openings and against the walls so as to hold the member in its engaged locking position.

23. The combination with parts to be fastened together, of an expansion locking-pin for engaging the side walls of partially-tapering openings in said parts and means operating with said parts and a member for expanding the pin, whereby to hold it in its engaged locking position.

24. The combination with parts to be fastened together, of a locking member engaging with partially-tapering faces of each of said parts and means for holding said locking member in position.

25. The combination with parts to be fastened together of a locking-pin passing through one of the parts and into the other, and engaging with partially-tapered faces of one part and the tapering faces of another and an encircling collar for holding said pins in its engaged locking position.

26. The combination with parts to be fastened together, of a locking-pin passing through each of the parts and means for expanding said pin and holding the same in its locking position against the partially-tapered face of one part and the tapered faces of another part.

FRANCIS H. RICHARDS.

Witnesses:
 FRED. J. DOLE,
 C. E. VOSS.